Nov. 12, 1963 — G. R. FOX — 3,110,527

HYDROSTATIC BEARING

Filed Oct. 29, 1959 — 2 Sheets-Sheet 1

Inventor:
Gerald R. Fox,
by Paul A. Frank
His Attorney.

Nov. 12, 1963  G. R. FOX  3,110,527
HYDROSTATIC BEARING
Filed Oct. 29, 1959  2 Sheets-Sheet 2

Inventor:
Gerald R. Fox,
by Paul A. Frank
His Attorney.

United States Patent Office 3,110,527
Patented Nov. 12, 1963

3,110,527
HYDROSTATIC BEARING
Gerald R. Fox, Schenectady, N.Y., assignor to General Electric Company, a corporation of New York
Filed Oct. 29, 1959, Ser. No. 849,564
14 Claims. (Cl. 308—122)

The present invention relates to hydrostatic bearings, and more particularly, to externally pressurized gas lubricated bearings.

Most commonly, bearings are supported by hydrodynamically created wedges of lubricant. However, in some applications the rotational speed of the journal and/or the nature of the lubricant does not provide an adequate film of lubricant and it is necessary that the journal be supported hydrostatically from an external pressure source.

The use of certain fluids such as gases is often dictated by high temperature, high radiation environments, by the need for a lubricant having inherent low friction characteristics or by the need for non-contaminating properties. These fluids may not possess what are commonly considered good lubricating characteristics and it is very often necessary that special devices and structures be incorporated in the bearing to render the construction suitable for use. One example of such a construction includes a bearing surface having a plurality of openings that are connected to a source of pressurized fluid by means including a flow restrictor. Changes in clearance between the journal and the bearing surface tend to regulate the flow of fluid from the openings thereby permitting increases in the fluid pressure in the area adjacent the openings in response to decreases in clearance. It has been found that the restriction of fluid flow, while advantageously accompanied by high pressures adapted to sustain greater loads, also diminishes the amount of fluid available for lubrication and in some instances, where rapid changes in load occur, the clearance between the journal and bearing surface is not maintained resulting in bearing failure.

The chief object of the present invention is to provide an improved externally pressurized bearing having inherent stiffness to respond quickly to changes in load.

Another object of the invention is to provide an improved gas lubricated bearing including means for increased lubricant flow at increased bearing loads.

A still further object is to provide a hydrostatic bearing construction having an improved valve for maintaining stiffness of the bearing during varying load conditions by controlling the lubricant supply to the bearing in response to load.

These and other objects of my invention will become more apparent from the following description.

Briefly stated, the present invention is directed to an externally pressurized bearing including a journal, a bearing surface enveloping the journal, a plurality of passages connecting a plurality of openings in the bearing surface to a source of fluid and valve means associated with the passages for controlling the flow of fluid through the passages in response to changes in bearing loads.

The invention will be more clearly understood from the detailed description of preferred embodiments described in the accompanying drawings, in which FIGURE 1 is a schematic view taken in a plane normal to the journal axis of a bearing construction employing the present invention;

Figure 1:
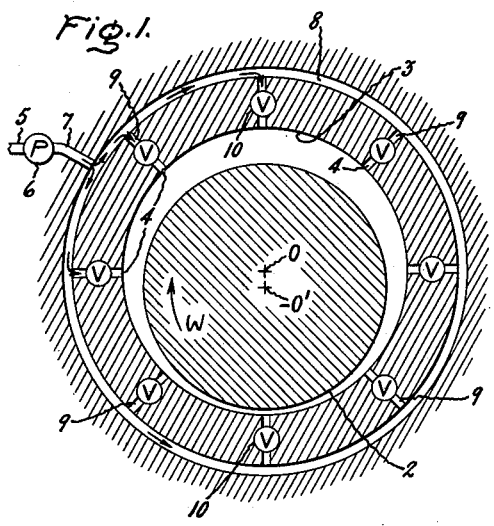

In FIGURE 1 there is shown a schematic view of a bearing construction taken in a plane normal to the journal axis. Journal 2 which rotates about its axis 0' in a direction ω is eccentric of cylindrical bearing surface 3 having its center at 0. A plurality of equally spaced openings 4 extend through bearing surface 3 and are connected to an annular manifold 8 by means of passages 9. A suitable fluid, such as a gaseous medium, is passed through line 5 to pump 6. Lubricant pump 6 supplies pressurized fluid through line 7 to manifold 8 and by means of the passages 9 the fluid is introduced to the area between journal 2 and bearing 3. The clearance between the surface of journal 2 and the area adjacent each opening 4 acts as a flow resistance in such a manner that high pressure areas exist adjacent the openings, the magnitude of the pressure being greater at points of lesser clearance. In situations where more viscous fluids are utilized, a construction without valves 10 may provide satisfactory bearing operation since the consistency of the viscous fluid will be sufficient to sustain normal bearing loads.

In situations wherein gases and liquids of similar low viscosity are utilized as a lubricant it is desirable to complement the throttling effect of the eccentricity of the journal by means of suitable valves 10 which respond to the pressure adjacent individual openings 4 to increase the flow and pressure of fluid adjacent these openings sufficient to maintain an adequate lubricant film. With the use of such fluids in constructions not utilizing valves 10, increases in load very often are capable of substantially halting the flow of lubricant and cause bearing failure.

Figure 2:
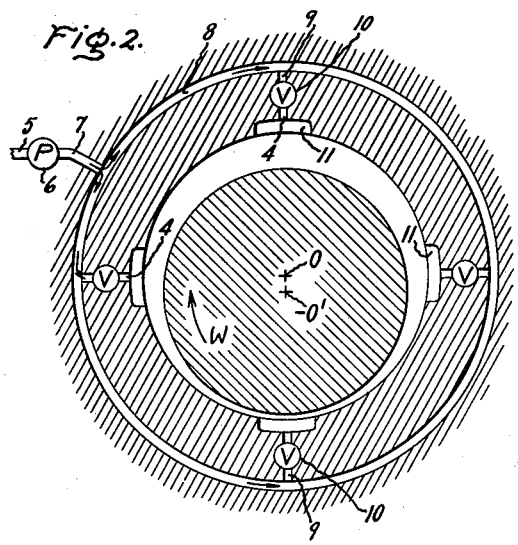
FIGURE 2 is a schematic view taken in a plane normal to the journal axis of another embodiment of the invention.

FIGURE 2 illustrates another embodiment of the invention shown in FIGURE 1. Lubricant is supplied through line 5 to pump 6. The lubricant pump discharges fluid through the line 7 into annular manifold 8 from which the fluid flows through a plurality of passages 9 through valves 10 to openings 4. Openings 4 in this embodiment are situated in suitable pockets 11. This construction differs from that shown in FIGURE 1 in that the bearing surface in FIGURE 1 is substantially cylindrical, FIGURE 2 the cylindrical bearing surface is modified by a plurality of evenly spaced pockets 11. This construction may have greater load carrying capacity since the throttling of the supply lubricant does not take place in a small circumferential area about openings 4 but rather along the larger circumferential area about pockets 11 thereby providing greater flow area. This greater flow area limits the effect of changes in clearance on lubricant flow and permits valve 10 to regulate lubricant flow to a greater extent.

Figure 3:
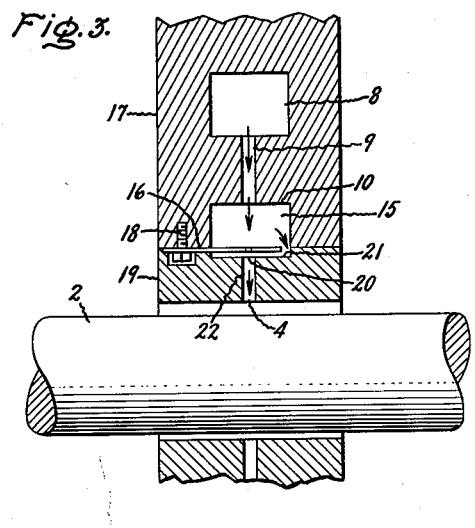
FIGURE 3 is a sectional view of the invention shown in FIGURE 1 taken in a plane passing longitudinally through the journal axis.

FIGURE 3 is a sectional view of the bearing construction shown in FIGURE 1 taken in a plane passing through the axis of journal 2. Journal 2 is in bearing engagement with bearing surface 3 through which a plurality of openings 4 extend. Housing member 17 has located therein means defining a portion of the annular manifold 8 which, as previously noted, is connected to a source of pressurized fluid. The lubricant fluid passes from the manifold through a low flow-resistance passage 9 to valve 10.

Valve 10 includes means for controlling the flow of fluid to the openings 4 in response to changes in bearing loads. Housing member 17 defines the upper portion of valve chamber 15. The lower portion of chamber 15 may be defined by annular member 19 which may also provide bearing surface 3. Housing member 17 is mounted on the annular member 19 by suitable means (not shown) and at the juncture surface where member 17 engages member 19 there is provided a clearance portion for the insertion of valve member 16 which is connected to member 17 by means of bolt 18. Valve member 16 is a cantilever mounted member which cooperates with lower surface 21 of chamber 15 in a manner to control the fluid flow through opening 20 to discharge openings 4 in the bearing surface.

Figure 4:
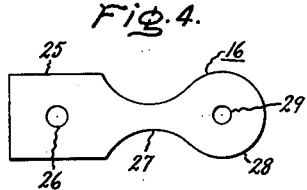
FIGURE 4 is a plan view of a valve member utilized in the valve construction shown in FIGURE 3.

Valve member 16, shown in FIGURE 4, comprises a thin resilient member including a mounting portion 25 having an opening 26 therein for passing bolt 18 therethrough to permit attachment of the valve member to member 17 shown in FIGURE 3. Adjacent the mounting portion 25 is the bending portion 27 which is a narrow necked section capable of deflecting readily in response to fluid pressures acting on both sides of the valve member. At the extremity of the valve member, opposite mounting portion 25, is located throttling portion 28 which may have substantially circular shape of substantially the same width as the mounting portion. In the center of this throttling portion may be provided an opening 29 having an area less than the cross-sectional area of opening 20 in member 19. The significance of this relationship will be more fully described hereinafter.

Considering the operation of the construction shown in FIGURE 3, fluid is continuously passed at supply pressure $P_s$ from manifold 8 through passage 9 to the pluraity of valves 10 as shown in FIGURES 1 and 2. After lubricant fluid enters chamber 15 of valve 10, it encounters valve member 16 which in its cooperating relationship wtih the wall 21 restricts the flow of fluid into the opening 20. This restricting action throttles the fluid pressure to a lower magnitude $P_1$. Fluid at pressure $P_1$ passes through passage 22 to opening 4. As the shaft rotates, the bearing load may vary and the clearance between the journal and bearing surface changes. As previously mentioned, this will cause a change in pressures in the areas adjacent the various oepnings 4 because the fluid passing from openings 4 will be selectively throttled by the change in clearance. From FIGURES 1 and 2 it can be seen that openings 4 along the lower portion of bearing surfaces 3 are the normal high pressure, low clearance areas because of the gravitational load of the journal. With increases in bearing load the pressure at the upper openings decreases.

As initially noted, when certain fluids such as gases are utilized as lubricants it is possible as a result of increased loads that the lubricant film may breakdown completely because of the less viscous nature of the fluid or lack of sufficient supply pressure. It is therefore necessary to provide compensating devices such as valves 10. Under such circumstances the decrease in clearance is reflected in higher pressures adjacent openings 4. This increase in pressure is reflected at opening 20 in valve 10 in such a manner that a bias is provided against the discharge side of valve member 16 shown in FIGURE 3. The resultant movement of the valving member increases the clearance between the valve member and wall 21 and permits more lubricant fluid to pass through opening 20 to the bearing surface. The throttling effect of the valve member is diminished so that $P_1$ increases to a magnitude approaching the supply pressure $P_s$. Under certain circumstances $P_1$ may equal $P_s$. To maintain proper operation of the valve member by assuring that a biasing fluid pressure exists between valve member 16 and surface 21, a suitable opening 29 is provided in the valve member. This opening 29 is extremely small and is provided merely for the purpose of maintaining fluid communication between valve chamber 15 and the bearing surface. This fluid path assures that sufficient fluid will be present in the passage 22 to maintain the control bias on the valve member.

In the event that the load on the journal decreases, the pressure in the area adjacent opening 4 decreases and this pressure is reflected in the pressure acting on the discharge side of the valve member. This permits the supply pressure in valve chamber 15 to bias the valve member to throttle the flow of fluid passing through opening 20, through passage 22 to opening 4.

Figure 5:
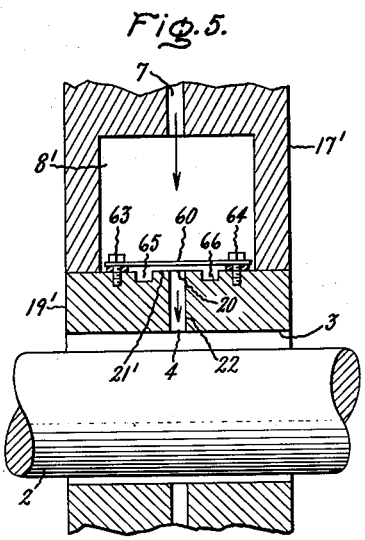
FIGURE 5 is a sectional view of another embodiment of the invention.

The annular manifold which passes fluid to the various passages passing to the bearing surface may, if desired, be incorporated into the valve for metering flow to the bearing surface. This construction is illustrated in FIGURE 5 wherein a housing 17' substantially envelops an annular member 19' to define the combined manifold and valve chamber 8'. Lubricant fluid may be passed into annular chamber 8' through passage 7 which is connected to a suitable lubricant fluid pump. Annular member 19' has an inner surface 3 which comprises the bearing surface of the present invention. An opening 4 extends through the bearing surface 3 and is connected by means of passage 22 and opening 20 to chamber 8'. In order to supply fluid to bearing surface 3 in response to changes in pressure adjacent opening 4, a valve member 60 is provided.

This valve member comprises a resilient strip having mounting portions at each end with suitable openings through which bolts 63 and 64 may attach the valve member to annular 19'. Adjacent opening 20 is surface 21' adapted to cooperate with the adjacent surface of the intermediate bending portion of valve member 60 to meter the flow of fluid through the passage 22. In order to permit lubricant fluid to enter the area adjacent opening 20, annular grooves 65 and 66 in annular member 19' may be provided and also, if it is desired, suitable shims 61 and 62 may be placed between the valve member 60 and the annular member 19'. This shim construction spaces member 60 from surface 21'. It will be noted that valve member 60 is mounted in the fashion of a beam having both ends fixed.

Considering the operation of the embodiment shown in FIGURE 5, lubricant fluid is supplied through passage 7 into annular chamber 8'. This fluid pressure tends to create a bias against the upper surface of valve member 60 causing a diminishment in the clearance between valve member 60 and surface 21' to throttle the flow of fluid to opening 20 and passage 22. If the load on bearing surface 3 changes, the clearance between journal 2 and surface 3 also varies. This causes a change in pressure in the fluid adjacent opening 4. This fluid pressure change is reflected at opening 20. The pressure differences acting on opposite sides of valve member 60 cause movement of the valve member either to increase or decrease the flow of fluid from chamber 8', through opening 20, through passage 22, to the area adjacent opening 4. This embodiment functions substantially in a similar manner as the embodiment in FIGURE 3 except in the manner in which deflection of the valve member is achieved.

Figure 6:
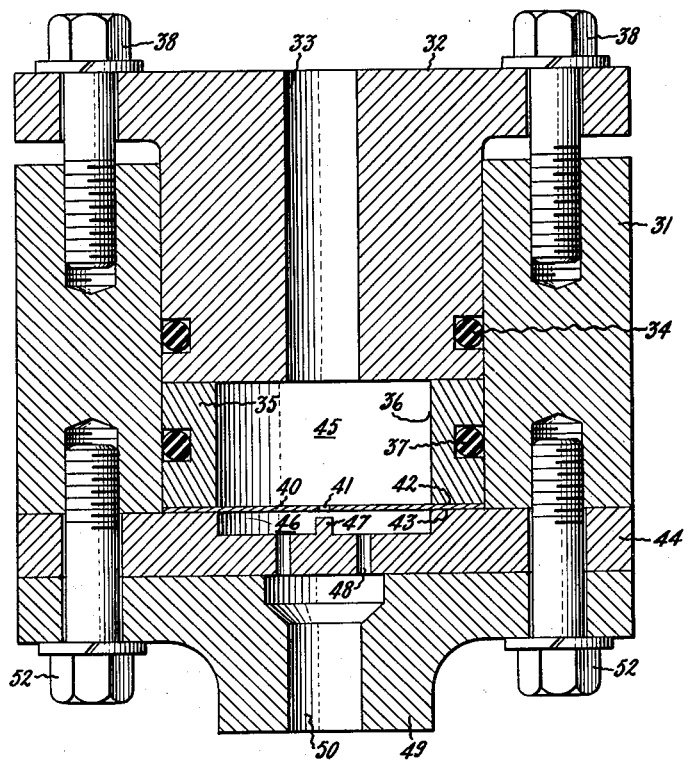
FIGURE 6 is a sectional view of a third embodiment of the invention.

In FIGURE 6 there is shown another embodiment of the valve member which may be utilized in the present invention. The valve is mounted in a housing 31 and includes a cylindrical member 32 which is in sealing engagement with housing 31 by means of O ring 34. Member 32 may be provided with a suitable flange to permit the attachment of member 32 to housing 31 by means of bolts 38. O ring 34 is fitted into a suitable annular recess in member 32. Member 32 is provided with a passage 33 which performs the function of passage 9 shown in FIGURES 1 and 2. A valve chamber 45 is partially defined by the lower surface of member 32 and the inner annular surface 36 of sleeve member 35. This sleeve member 35 is in sealing engagement with housing member 31 by means of O ring 37 which is fitted into a suitable annular recess in member 35. The lower portion of chamber 45 is defined by member 44 which has a cup portion 46. The center of the cup portion is provided with a suitable spindle 47, the purpose of which will be described more fully hereinafter. A plurality of openings 48 through member 44 are disposed about said spindle.

For the purpose of controlling fluid flow, cup portion 46 of member 44 is separated from the upper portion of chamber 45 by means of resilient diaphragm 40 which has a suitable opening 41 cooperating with spindle 47. Diaphragm 40 is supported about its annular periphery between shoulder 42 of sleeves 35 and shoulder 43 of member 44. A member 49 is mounted adjacent member 44 and is attached to housing member 31 by means of bolts 52. This member 49 has a passage 50 which is adapted to be in communication with an opening 4 passing through the bearing surface. Opening 50 is in communication with the valve chamber by means of the previously mentioned plurality of openings 48.

Considering the operation of this embodiment of the valve, fluid from a suitable manifold passes through passage 33 into valve chamber 45. This supply pressure acts on the upper surface of diaphragm 40 and depending upon the pressure differential existing between the upper portion of valve chamber 45 and cup portion 46, diaphragm 40 is suitably deflected. This deflection determines the width of the annular variable orifice defined by the edge of opening 41 and the top of spindle 47. The fluid passing into cup portion 46 passes through openings 48 through passage 50 to the bearing surface. As the pressure in passage 50 varies in response to changes in clearance between the journal and the bearing, this pressure is reflected in cup portion 46 to change the position of diaphragm 40 and thereby meter the amount of the fluid passing into the cup portion in response to changes in load.

Figure 7:
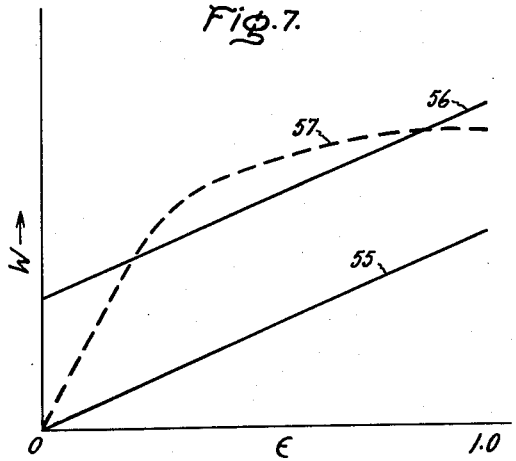
FIGURE 7 is a diagram plotting load versus eccentricity ratio.
Figure 8:
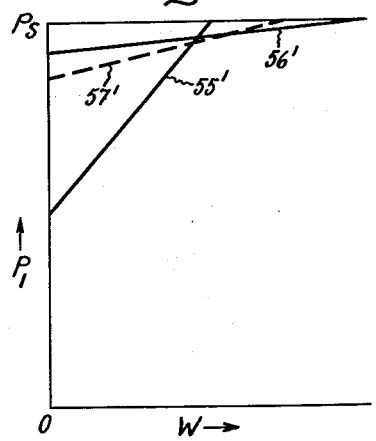
FIGURE 8 is a diagram plotting bearing pressure versus load.

In FIGURES 7 and 8 there are shown diagrams illustrating the response of the present invention to changes in load, by plotting the eccentricity $e$ (displacement/radial clearance) with respect to changes in load W and changes in fluid pressure $P_i$ with respect to changes in load W.

In FIGURE 7, lines 55 and 56 illustrate systems wherein a fixed orifice or capillary is utilized to throttle fluid flow to the bearing surface. It is noted that the systems illustrated responded to load in substantially straight line relationships. System 55 employs orifices connected to openings extending fully around the bearing surface and at no load has no journal eccentricity. System 56 utilizes the orifices having the discharge openings therefrom extending over only an arc of the bearing surface. System 56 has greater load carrying capacity and with no journal eccentricity is capable of sustaining substantial loads. The dotted line 57 illustrates the eccentricity relationship of a system employing the present invention. In this system increases in load are accompanied by slighter increases in eccentricity $e$ and substantially maximum load may be supported with an eccentricity $e$ of approximately 0.5.

FIGURE 8 illustrates the relationship between load and the fluid pressure at the bearing surface, line 55' being the relationship for the system illustrated as the line 55 in FIGURE 7. It is noted that the pressure $P_i$ increases very rapidly with respect to increases in load. The relationship for line 56' (the system of line 56 in FIGURE 7) is such that the no load pressure is substantially supply pressure and increases slightly with increases in load. It will be noted that line 57', illustrating the system of the present invention, at no load lies intermediate the systems shown as 55' and 56'. A change in $P_i$ takes place with a change in load in a moderate fashion with less drastic changes in eccentricity (FIGURE 7) than in the systems shown as 55 and 56.

The present invention is directed to a hydrostatic bearing construction for bearings utilizing lubricants of low viscosity such as gases wherein the construction has the ability to accommodate increased loads without substantial increases in eccentricity. This is achieved by increasing the lubricant pressure with increases in load and also by increasing the lubricant supply in response to this increase in load.

While there have been described preferred embodiments of the present invention, it will be appreciated that the invention is not limited thereto but that various modifications may be made without departing from the scope of the appended claims.

What I claim as new and desire to secure by Letters Patent of the United States is:

1. In an externally pressurized bearing, the combination of a journal, a substantially circular bearing surface enveloping said journal, a source of pressurized fluid, means defining a plurality of openings extending through said bearing surface and communicating with the source of pressurized fluid, at least one of said openings having associated therewith valve means for increasing and decreasing the passage of fluid to said opening in response to changes in fluid pressure in the area adjacent said opening to influence the pressure conditions which actuate the valve means, said valve means being located between the source of pressurized fluid and said opening.

2. The bearing according to claim 1 in which the valve means comprises means defining a chamber, means for introducing supply fluid into said chamber, means defining a discharge opening from said chamber connected to one of the openings in the bearing surface and a valve member operatively associated with said discharge opening, a change in pressure in the area of the opening in the bearing surface being reflected by a change in pressure at the discharge opening, the pressure difference between the chamber and area adjacent the discharge opening moving the valve member to control the flow of fluid to the opening in the bearing surface.

3. The bearing according to claim 2 in which the valve member comprises a flat, resilient member having a mounting portion, a throttling portion adapted to be operatively associated with the discharge opening and a bending portion having a narrow necked section which connects the mounting portion to the throttling portion, said flat, resilient member being adapted to bend to vary the distance between the throttling portion and the discharge opening.

4. The bearing according to claim 3 in which the valve member further comprises means defining an opening therein substantially smaller than the cross-sectional area of the discharge opening.

5. The bearing according to claim 2 in which the valve member comprises a flat, resilient strip having a mounting portion at each end thereof and an intermediate bending portion being adapted to deflect to vary the distance between the bending portion and the discharge opening.

6. The bearing according to claim 2 in which the valve member comprises an annular diaphragm having means defining an opening therein, said means defining an opening being adapted to move relative a surface of the valve chamber to regulate the flow of fluid through the opening.

7. In an externally pressurized bearing, the combination of a rotatable journal, a cylindrical bearing surface substantially enveloping said journal, means defining a plurality of openings adapted to introduce fluid into the area between the journal and the bearing surface, a plurality of passages adapted to connect said openings to a source of pressurized fluid, at least one of said passages having valve means associated therewith for increasing and decreasing the supply of fluid passing through the passage in response to fluid pressure in the area adjacent one of said openings to influence the pressure conditions which actuated the valve means, said valve means being located between the source of pressurized fluid and said opening.

8. The bearing according to claim 7 in which the cylindrical bearing surface has means defining a plurality of pockets, each of said openings discharging fluid into one of said pockets.

9. The bearing according to claim 7 in which the valve means comprises means defining a chamber, means for introducing fluid into said chamber, means defining an opening for discharging fluid from said chamber, a valve member mounted in said chamber, said valve member being adapted to control the passage of fluid from said chamber in response to a predetermined pressure difference acting on opposite sides of the valve member.

10. In an externally pressurized bearing, the combination of a rotatable journal, a cylindrical bearing surface substantially enveloping said journal, means defining a plurality of openings adapted to introduce fluid into the area between the journal and the bearing surface, a plurality of passages adapted to connect said openings to a source of pressurized fluid, at least one of said openings having valve means associated therewith for increasing and decreasing the supply of fluid passing through the passage in response to fluid pressure in the area adjacent one of the said openings, said valve means comprising means defining a chamber, means for introducing fluid into said chamber, means defining an opening for discharging fluid from said chamber, a valve member mounted in said chamber, said valve member being a flat resilient member having a mounting portion, a throttling portion adapted to cooperate with a surface of the valve member, and a bending portion having a narrow neck section which connects the mounting portion to the throttling portion, said flat resilient member being adapted to bend in cantilever fashion to vary the distance between the throttling portion and the discharge opening to control the passage of fluid from said chamber in response to a predetermined pressure difference acting on the opposite sides of the valve member.

11. The bearing according to claim 10 in which the valve member further comprises means defining an opening therein substantially smaller than the cross-sectional area of the discharge opening.

12. The bearing according to claim 7, in which the valve member comprises a flat, resilient strip having a mounting portion on each end thereof and a bending portion located intermediate the mounting portions, said resilient strip being adapted to deflect to vary the distance between the bending portion and discharge opening.

13. The bearing according to claim 9 in which the valve member comprises an annular diaphragm having means defining an opening therein, said diaphragm opening being adapted to move relative the surface of the valve to regulate the flow of fluid through the diaphragm opening.

14. In a valve construction for use in a bearing, the combination of means defining a chamber, means adapted to supply the chamber with a pressurized fluid, means defining a discharge opening from the chamber for supplying the fluid to a bearing surface, a valve member mounted in said chamber for increasing and decreasing the passage of fluid from said chamber in response to predetermined pressure differences acting on opposite sides of the valve member, said valve member comprising a flat resilient member having a mounting portion, a throttling portion adapted to cooperate with a surface of the valve member and a bending portion having a necked section which connects the mounting portion to the throttling portion, said throttling portion having means defining an opening therein having a cross-sectional area less than the cross-sectional area of the discharge opening, said flat resilient member being adapted to bend in cantilever fashion to vary the distance between the throttling portion and the discharge opening.

References Cited in the file of this patent

UNITED STATES PATENTS

| 303,813 | Cousins | Aug. 19, 1884 |
| 1,781,366 | Campula | Nov. 11, 1903 |
| 2,459,826 | Martellotti | Jan. 25, 1949 |
| 2,716,427 | Cantalupo | Aug. 30, 1955 |
| 2,884,382 | Sixsmith | Apr. 28, 1959 |
| 2,976,087 | Cherubim | Mar. 21, 1961 |

FOREIGN PATENTS

| 548,363 | Great Britain | Oct. 7, 1942 |